2,718,609

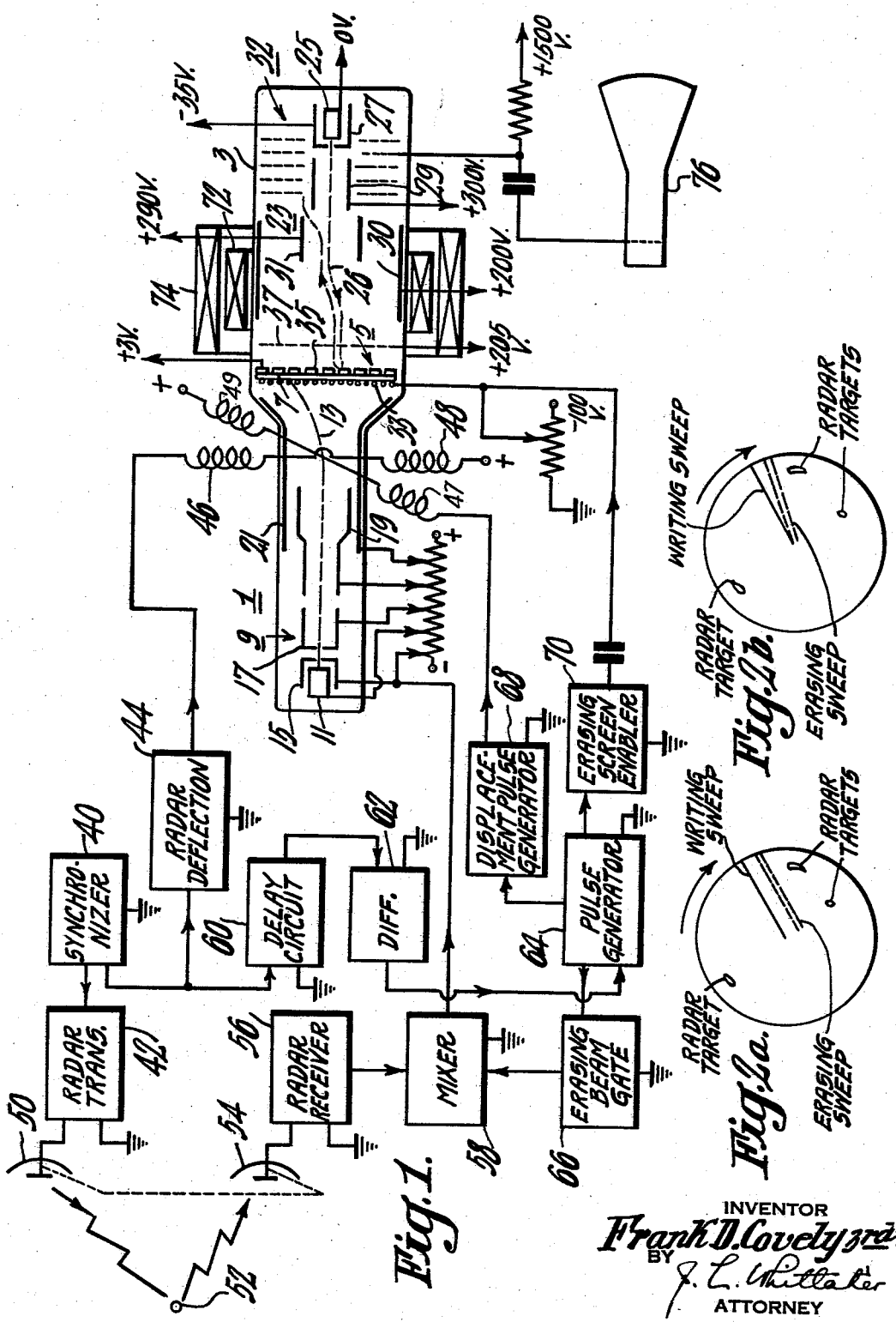

SCAN CONVERSION SYSTEM WITH PROGRESSIVE CYCLICAL ERASURE

Frank D. Covely 3rd, Collingswood, N. J., assignor to Radio Corporation of America, a corporation of Delaware Application December 19, 1951, Serial No. 262,377

8 Claims. (Cl. 315—13)

This invention relates generally to systems employing electrical storage tube devices and more particularly to scan conversion systems in which stored electrical data, including half-tones, is cyclically and progressively erased and replaced with new data.

Presently known scan conversion systems have been utilized extensively in a number of different radio navigation systems. One type of storage device which may be used for scan conversion is described in a copending application, Serial No. 29,746, filed May 28, 1948, by L. Pensak and entitled "Electrical Storage Tube," now abandoned. This tube includes different electron guns disposed on opposite sides of a storage target. One of the electron guns, generally referred to as the "writing gun," provides an electron beam which may be deflected to scan the storage target at a predetermined scanning rate to establish a charge pattern thereon. The second electron gun, called the "reading gun," produces an electron beam which may be deflected across the storage target at a different scanning rate to produce output signals proportional to the stored signals.

In systems including a storage tube of the type described above, it may be desirable to obtain many copies or readings of the charge pattern established on the storage target. These copies generally are obtained by repetitively scanning the storage target with the reading beam. This repetitive scanning process, however, gradually erases the stored charge to the extent that "half-tone" signals lying between the maximum and minimum intensity signals applied to the tube may not be distinguishable therefrom. Also, the different rates of signal decay during scanning for the different intensity signals are troublesome in resolving half-tones.

The half-tone signal response may be especially important, for example, in systems employing pictorial display radar equipment (Teleran). In the reception of radar signals reflected and/or retransmitted from an aircraft located behind a cloud, it is apparent that the absence of half-tone resolution may cause the reflected signal from the cloud to mask the signal from the aircraft. Generally, before a suitable number of copies of such a charge pattern are made, the stronger signal from the aircraft tends to merge into the weaker and generally larger in area signal from the cloud. At times when weather is particularly bad, it is obvious that the loss of half-tone information such as this may complicate traffic control and other problems.

A storage tube especially suited for scan conversion in such radio navigation systems and having improved half-tone signal response is described in a copending application, Serial No. 259,344, also filed by L. Pensak on December 1, 1951, and entitled "Storage Tube." The operation of this tube is such that the reading process does not erase the signals stored, hence it is necessary to provide some means independent of the reading process for effecting desired erasure. In this tube, erasure may be accomplished, when desired, by gating a suppressor grid on the writing gun side of the storage target to approximately zero volts and substantially simultaneously turning on the writing beam electron gun. The writing beam may then be continuously, or in any other desired manner, scanned across the storage target to erase the charge pattern previously established.

While this erasing technique, per se, may be satisfactory for erasing stored transients and other like charge patterns, the erasure requirements for radar scan conversion are generally more exacting. This is true, by way of example, when it is desirable to translate information stored either in polar co-ordinate form or in B-scan form into corresponding rectilinear television signals. Also, the mode of erasing stored data should be such that the erasure be progressive and cyclical. In this manner an "up to date" storage of information may be obtained.

According to the instant invention, which is preferably utilized in connection with a half-tone storage tube such as described in the aforementioned application, Serial No. 259,344, the writing gun electron beam of the storage tube is turned on in the intervals between successive writing operations and is displaced in the direction of writing whereby erasure may be effected with the writing beam during its normal return time. Since the writing beam is angularly displaced a fixed amount after each writing operation, and since the writing is progressive, a progressive and cyclical erasure may also be obtained.

An object of the present invention is to provide an improved system for erasing electrical data stored in a half-tone electrical storage device.

Another object of the invention is to cyclically and progressively erase previously stored data just prior to the writing of new data.

Another object of the invention is to provide cyclical erasure means especially adapted for use in scan conversion systems in which the process of reading does not erase stored signals.

Another object of the invention is to provide a scan conversion system in which an "up to date" store of radar data may be maintained.

In a typical embodiment of the invention, radar PPI (Plan Position Indicator) type deflection signals are utilized to deflect the writing beam of the half-tone storage tube referenced above. Radar echo signals, in modulating the writing beam, establish a PPI type charge pattern on the storage target. After radar signals from one 360° scan have been stored, it is readily apparent that further cyclical writing without erasure is undesirable (assuming that integration is not to be obtained) since some of the data previously written may correspond to an object or objects no longer within the service range of the radar system. It is also undesirable to completely erase the 360° scan since, in a number of radar systems, four to six seconds is generally required for obtaining a complete new PPI scan. Also, if the writing process is stopped to completely erase a 360° scan, the radar information normally received during this erase period is not stored and is lost. Accordingly, since echo data obtained from successive radar transmitter pulses is sequentially written upon the storage target in a progressive manner (generally clockwise) and is to be periodically replaced with new data obtained from cyclically recurring 360° azimuth scans, cyclical erasure is required for maintaining an "up to date" store of radar data.

The cyclical erasure is obtained, according to the invention, during the "flyback" time of the writing beam during which time the writing beam is normally turned off. In this flyback interval, the position of the normally cutoff writing beam is advanced from one to several PPI lines in the direction of writing. The writing beam current is then turned on and the beam is scanned across a portion of the storage target to erase a part of the previously written data. This procedure is followed during each flyback time such that erasure occurs several PPI lines in advance of writing new data.

The invention will be described in greater detail with reference to the accompanying drawing in which Figure 1 is a schematic block diagram of a scan conversion system in which progressive cyclical writing and erasing is required; Figure 2–a is a pictorial representation of a cathode ray tube display in which the system of Figure 1 provides an off-center erasing sweep; and Figure 2–b is a pictorial representation of a cathode ray tube display in which the system of Figure 1 provides a radial erasing sweep.

Storage tube structure

The half-tone storage tube 1 used in conjunction with the instant invention is preferably that which is described in the previously cited Pensak application, Serial No. 259,344, filed December 1, 1951, and has an evacuated envelope 3 substantially tubular in form. A storage target 5 is mounted in the center portion of the tube and consists principally of a dielectric member 7, such as mica, mounted transversely to the axis of the tube envelope. An electron gun structure 9 is positioned on one side of the storage target 5 and is used to establish a charge pattern on the adjacent surface of the dielectric target member 7. This gun structure 9 is generally referred to as the "writing gun" and includes a cathode 11 for providing a writing beam of electrons 13, a control grid 15, a screen grid 17, a first accelerating anode 19, and a second accelerating anode 21 of the conductive wall coating type. A second electron gun 23 is mounted on the opposite side of the storage target 5 and is utilized as a "reading gun." The reading gun includes a cathode 25 for producing a reading beam of electrons 26, a control grid 27, a first accelerating anode 29, and a second accelerating anode 30 which consists of a conductive wall coating. A "persuader" electrode 31 is provided for directing the returning reading beam 26, which is modulated in accordance with the stored charge, into an electron multiplier 32 for subsequently producing useful output signals.

On the writing gun side of the dielectric member 7, a suppressor grid 33 is provided which is spaced between 0.003" and 0.010" therefrom. In intervals in which data are written on the dielectric member 7, the suppressor grid 33 is usually operated at a potential between —50 v. and —100 v. The opposite side of the dielectric member, adjacent the reading gun, is used to support a fine mesh metallic screen 35 which serves as a collector electrode for the reading gun beam 26. The mesh screen potential is preferably maintained at +3 volts. Also, on the reading gun side of the target, a screen electrode 37 is mounted in a spaced relation to and for the purpose of repelling positive ions travelling toward the storage target 5.

Scan conversion system

The operation of the system is substantially as follows. A synchronizer 40, which may be a pulse generator, produces repetitive signals at a given pulse repetition rate which may be of the order of 1000 pulses per second. The pulses are used to key a radar transmitter 42 and also are utilized to actuate radar reflection circuitry 44, here assumed to be of the PPI type. The sawtooth deflection signals produced by this circuitry 44 are coupled to a pair of deflection coils 46 and 48 whereby the writing beam 13 of the storage device 1, from a fiducial point, linearly and radially sequentially scans the storage target 5. The rotating coil type of PPI deflection system is shown in Figure 13.44 of volume 1 of the MIT Radiation Laboratory Series and is described generally at page 534.

The synchronizer pulses applied to the radar transmitter 42 repetitively key the transmitter to produce a series of high power output pulses which may be radiated from an antenna 50 directional in characteristic. The deflection coils 46 and 48 are rotated in synchronism with the radar antenna 50. A portion of the high power radiated signal energy, after reflection or retransmission by one or more remote wave reflecting objects indicated at 52, is received by a receiving antenna 54 and coupled to a radar receiver 56. In practice, a transmit-receive switching device (not shown) enables a common antenna to be used for both the transmission and reception of the radar pulse signals. The radar video signals appearing at the output of the receiver 56 are coupled through a mixer 58, the output of which is preferably applied to the control grid 15 of the half-tone storage tube 1. In this manner a charge pattern corresponding to radar data in polar co-ordinates may be established on the storage target 5. The mixer 58 may be of the type shown in Figure 18.12 (page 641) of volume 19 of the MIT Radiation Laboratory Series.

The method of erasing the stored charge pattern may best be understood when considering the operation of the system in the interval between any two successive radial writing operations. A given synchronizer pulse, which keys the radar transmitter 42 and also initiates the radial range sweep of the writing gun, is applied to a time delay circuit 60, such as a phantastron delay circuit. The time delay of this circuit is adjusted to be slightly greater than the time required for the writing beam range sweep. With a pulse repetition rate of 1000 P. P. S. and a range sweep time of 500 microseconds, the delay may be approximately 510 microseconds. The delayed pulse is then differentiated in a differentiating circuit 62, the output of which is applied to a pulse generator 64.

The pulse generator 64 produces output signals which are coupled to three different circuits, an erasing sweep gate 66, a displacement pulse generator 68, and an erasing screen enabler 70. The erasing screen enabler 70, a pulse generator, produces an output signal which is applied to the suppressor grid 33 on the writing gun side of the storage target. The pulse generators 64, 68, and 70 may be one of the types of monostable multivibrators shown and described in Section 5.5 of volume 19 of the MIT Radiation Laboratory Series, pages 166 through 171. This signal changes the suppressor potential from a writing potential of between —50 v. and —100 v. to an erasing potential of approximately zero volts and maintains the suppressor grid at this potential until just prior to the start of the next writing operation. Simultaneously, the displacement pulse generator 68, which may be a square wave generator, provides an output signal which is applied to a pair of serially connected auxiliary deflection coils 47 and 49 in phase quadrature with the PPI deflection coils 46 and 48. The amplitude of the displacement signal is chosen to advance the position of the writing beam as desired, while its pulse duration is substantially the same as that of the erasing screen enabling pulse. The erasing sweep gate signal is applied to the writing gun control grid 15 of the storage tube 1 thereby turning on the previously blanked writing beam for the period of time required for sweeping the displaced writing beam across the target to effect erasure. The writing beam is preferably "gated on" several microseconds after its angular displacement in order that no writing beam transients occur.

With the performance of the three operations above described, the writing beam may be substantially simultaneously turned on and advanced, in the direction of writing, from one to several PPI lines from the point at which the writing beam was turned off while last writing. If the displacement pulse generator output signal is substantially a square wave, an off-center type of erasing sweep shown in Figure 2–a may be obtained. The preferred method of erasing is to erase the stored charge as the writing beam returns toward the center of the target.

If desirable, however, the writing beam, during the normal blanking time, may be returned rapidly to its fiducial origin, displaced in the direction of writing and turned on as before, and then deflected radially outward to erase. This mode of operation is obviously more complicated and generally is not preferred. If the requirements of a particular radar system are such that the off-center erasing sweep is not satisfactory, a radial erasing sweep, shown in Figure 2–b, may be obtained by distorting the pulse obtained from the displacement pulse generator 68 or by replacing the square wave generator with a suitable source of sawtooth signals. Meanwhile, by means of suitable focus and deflection circuitry 72 and 74, the reading beam 26 may be continuously scanned across the storage target 5 during both writing and erasing to provide output signals corresponding to the stored charge pattern. These output signals obtained from the electron multiplier 32 may then be applied to a kinescope 76 to provide a visual display of the converted picture.

By performing the above-described operations of writing during each range sweep and then erasing during each "flyback" interval, old data is sequentially and progressively erased in recurring PPI cycles slightly in advance of the writing of new data and an up to date store of data may be maintained. Although a small wedge appears between writing and erasure in a given sequence of operations, the size of this wedge may be controlled by controlling the amplitude of signals obtained from the displacement generator 68. Also, the wedge effect is not serious since the wedge continuously rotates with the writing strobe and no "dead zone" is introduced in the system. Furthermore, the extent of erasure may be adjusted such that the stored data is not completely erased. In this manner, integration of cyclically recurring signals may be obtained to effectively increase the signal-to-noise ratio of the system with which this scan conversion system is used. Also, target "trails" of decreasing intensity may be utilized to indicate the direction of target movement as well as the target's approximate velocity. It should be noted that the writing beam, in both writing and erasing, has a certain amount of "overlap," when scanning in PPI fashion, near the center of the storage target. The overlap may cause an area of no signal at very short ranges, however, this effect may not be serious. In short range radars where this effect may be troublesome, the area of no signal may be reduced by controlling the erasing current and thus the beam diameter as a function of the position of the writing (or erasing) beam. Where the beam is near the periphery of the target (where no overlap occurs), the beam current may be substantially greater than when the beam is near the center of the target.

Thus the instant invention is adapted for use in generally any system in which scan conversion is necessary and in which the reading process does not erase the stored data. The invention has been described with reference to the cyclical erasure of data written in polar coordinate form. This method of erasure is equally applicable to the cyclical erasure of information written in B-scan form. It has been shown that, with minor variations, the system may be used with both long and short range radars and also may be used for signal integration. A further advantage of the invention is that the instant invention affords an up to date store of electrical data whereas some previous systems require complete erasure followed by a complete writing operation. Also, it should be noted that the present invention affords continuous reading during both writing and erasure.

What is claimed is:

1. In a system employing a storage device having a storage target and means for providing a cathode ray beam for writing electrical data upon said storage target and a different cathode ray beam for the subsequent reading of said data without erasure thereof, apparatus for writing, erasing, and reading comprising, means for sequentially and progressively deflecting and modulating said writing beam with electrical data to cyclically write lines of data on said target, means effective in the intervals between successive writing operations for displacing said writing beam a predetermined number of lines, including one, in the direction of said writing, means for utilizing said displaced writing beam to scan said storage target to erase data stored on the target portion scanned by said displaced beam, and means for reading the remaining data stored on said storage target with said reading beam during the intervals of said writing and erasing.

2. In a system employing a storage device having a storage target and means for providing a cathode ray beam for writing electrical data upon said storage target and a different cathode ray beam for the subsequent reading of said data without erasure thereof, apparatus for writing, erasing, and reading comprising, means for cyclically radially deflecting said writing beam from a fiducial point, means for sequentially and progressively modulating said writing beam during said radial deflections with electrical data to cyclically write lines of data on said target, means effective in the intervals between successive writing operations for displacing said writing beam a predetermined number of lines, including one, in the direction of said writing, means for utilizing said displaced writing beam to radially scan said storage target to erase data stored on the target portion scanned by said displaced beam, and means for reading the remaining data stored on said storage target with said reading beam during the intervals of said writing and erasing.

3. In a system employing a storage device having a storage target and means for providing a cathode ray beam for writing electrical data upon said storage target and a different cathode ray beam for the subsequent reading of said data without erasure thereof, apparatus for writing, erasing, and reading comprising, means for cyclically radially deflecting said writing beam from a fiducial point on said storage target to sweep said writing beam across said target, means for sequentially and progressively modulating said writing beam during said radial deflections with electrical data to cyclically write lines of data on said target, means effective in the writing beam return times between successive writing operations for displacing said writing beam a predetermined number of lines, including one, in the direction of said writing, means for radially sweeping said displaced writing beam during said return times across said target toward said fiducial point to progressively and cyclically erase data stored on the target portion scanned by said displaced beam, and means for reading the remaining data stored on said stored target with said reading beam during both writing and erasing.

4. In a system in which electrical data stored in an electrical storage device is periodically erased and replaced with new data, apparatus for writing, erasing, and reading said data comprising, connection means for a source of electrical data, an electrical storage device including a storage target and means for providing a cathode ray beam for writing said data on said target and a different cathode ray beam for the subsequent reading of said data without erasure thereof, deflection means for sequentially and progressively deflecting said writing beam to cyclically scan said storage target whereby said electrical data is written on said target, signal producing means recurrently triggered between successive ones of said deflections for producing signals having pulse durations less than one-half the intervals between said successive deflections, means coupled to said signal producing means and responsive to said recurrent signals for displacing said writing beam in the direction of said progressive writing, said displaced writing beam being scanned across said target during said intervals to progressively and cyclically erase said stored data, and means for scanning said target with said reading beam during the intervals of said writing and erasing to read the remaining data stored on said target.

5. In a system in which electrical data stored in an electrical storage device is periodically erased and replaced with new data, apparatus for writing, erasing, and reading said data comprising, connection means for a source of electrical data, an electrical storage device including a storage target and means for providing a cathode ray beam for writing said data on said target and a different cathode ray beam for the subsequent reading of said data without erasure thereof, a first deflection means for sequentially and progressively deflecting said writing beam to cyclically scan said storage target whereby said electrical data is written on said target, signal producing means recurrently triggered between successive ones of said deflections and after each writing operation for producing signals having pulse durations less than one-half the intervals between said successive deflections, auxiliary deflection means coupled to said signal producing means in phase quadrature with said first deflection means and responsive to said recurrent signals for displacing said writing beam in the direction of said progressive writing, said displaced writing beam being scanned across said target during said intervals to progressively and cyclically erase said stored data, and means for scanning said target with said reading beam during both said writing and erasing to read the remaining data stored on said target.

6. In a system in which electrical data stored in an electrical storage device is periodically erased and replaced with new data, apparatus for writing, erasing, and reading said data comprising, connection means for a source of electrical data, an electrical storage device including a storage target and means for providing a cathode ray beam for writing said data on said target and a different cathode ray beam for the subsequent reading of said data without erasure thereof, a first deflection means for sequentially and progressively radially deflecting said writing beam to cyclically scan said storage target whereby said electrical data is written on said target, time delay means, means for synchronously applying timing signals to said deflection means and to said time delay means, said time delay means delaying signals applied thereto while said writing beam is writing said data on a portion of said target, signal producing means responsive to timing signals delayed in said delay means for producing recurrent signals having pulse durations less than one-half the intervals between successive writing operations, means including auxiliary deflection means in phase quadrature with said first deflection means and responsive to said recurrent signals for displacing said writing beam in the direction of said progressive writing, said displaced writing beam being scanned across said target during said intervals to progressively and cyclically erase said stored data, and means for scanning said target with said reading beam during both said writing and erasing to read the remaining data stored on said target.

7. Apparatus as claimed in claim 4 wherein said signal producing means is cooperative with said writing beam displacing means for scanning said writing beam across said target during said erasing intervals in direction radially opposite to said writing scansions.

8. Apparatus as claimed in claim 4 wherein said signal producing means comprises a substantially square wave generator.

References Cited in the file of this patent
UNITED STATES PATENTS

| | | |
|---|---|---|
| 2,451,005 | Weimer et al. | Oct. 12, 1948 |
| 2,547,638 | Gardner | Apr. 3, 1951 |
| 2,549,072 | Epstein | Apr. 17, 1951 |
| 2,589,460 | Tuller | Mar. 18, 1952 |
| 2,617,963 | Arditi | Nov. 11, 1952 |